(12) United States Patent
Hirasawa et al.

(10) Patent No.: US 7,648,194 B2
(45) Date of Patent: Jan. 19, 2010

(54) INDOOR STRUCTURE OF VEHICLE

(75) Inventors: Kiyoshi Hirasawa, Shizuoka-Ken (JP); Masaya Suzuki, Iwata (JP); Hitoshi Takane, Iwata (JP); Kiyokazu Fujisawa, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 280 days.

(21) Appl. No.: 11/789,838

(22) Filed: Apr. 26, 2007

(65) Prior Publication Data

US 2008/0036231 A1 Feb. 14, 2008

(30) Foreign Application Priority Data

May 23, 2006 (JP) ............... 2006-142339

(51) Int. Cl.
*B62D 25/22* (2006.01)
(52) U.S. Cl. ............... 296/203.03; 280/163; 296/65.05; 296/97.23; 296/155
(58) Field of Classification Search .......... 280/163, 280/164.1; 296/65.05, 97.23, 155, 193.05, 296/193.07, 203.03
See application file for complete search history.

(56) References Cited

U.S. PATENT DOCUMENTS 1,939,604 A * 12/1933 Bronson ............... 280/163
2,057,873 A * 10/1936 Atwood ............... 428/40.1
2008/0238020 A1* 10/2008 Okada et al. ............ 280/166

FOREIGN PATENT DOCUMENTS

| JP | 57-88674 | | 11/1955 |
| JP | 59230841 | A * | 12/1984 |
| JP | 60032134 | U | 2/1985 |
| JP | 60199722 | A * | 10/1985 |
| JP | 01317828 | A * | 12/1989 |
| JP | 02081772 | A * | 3/1990 |
| JP | 7-228207 | | 8/1995 |

OTHER PUBLICATIONS

Office Action from corresponding Chinese Application No. 200710097455.

* cited by examiner

*Primary Examiner*—Glenn Dayoan
*Assistant Examiner*—Paul A Chenevert
(74) *Attorney, Agent, or Firm*—Lerner, David, Littenberg, Krumholz & Mentlik, LLP (57) ABSTRACT

In an indoor structure of a vehicle including a door (12) provided in a door opening (20) at the side of a vehicle and a step (5) for passenger ingress and egress provided on the indoor side of the door opening, the step being located at a lower position than a floor (4) of the vehicle compartment, an expanded floor portion (6) substantially level with the floor (4) is provided on the vehicle rear side of the step (5). Also, a rear leg (24) of a foldable seat (2) is extended outward in the vehicle width direction in the vehicle compartment, and is placed on the expanded floor portion (6).

11 Claims, 12 Drawing Sheets

INDOOR STRUCTURE OF VEHICLE

FIELD OF THE INVENTION

The present invention relates to an indoor structure of a vehicle provided with a door in a vehicle side portion and an ingress-egress step extending along the indoor side of a door opening of the door. More particularly, it relates to an indoor structure of a vehicle provided with a seat positioned in the range of the door opening in the front and rear direction of the vehicle and a seat positioned at the rear thereof.

BACKGROUND OF THE INVENTION

A conventional wagon-type vehicle having a plurality of rows of seats positioned in the front and rear direction of the vehicle is provided with a slide door capable of securing a wide door opening, and also is often provided with an ingress-egress step in the door opening portion in consideration of ease of ingress to and egress from a relatively high floor. Since such a step is provided at a low position with respect to the floor surface, the passenger cannot put his/her foot on the step, or the step cannot be utilized as a part of the floor.

To solve this problem, JP 57-88674 U1 discloses a technique in which there is provided a retractable cover plate for covering a portion above the step according to the opening/closing of the slide door. In this technique, when the door is open, the cover plate is retracted to use the step as an ingress-egress step, and when the door is closed, the cover plate is spread out over the step to form a flat floor surface. However, such a retractable cover plate requires a complicated retraction mechanism, a seal structure for protecting the mechanism portion from dust and muddy water, and structural strength capable of withstanding the ingress and egress of passenger are required, so that a greatly increased cost is expected. Also, since the retraction of the cover plate takes up space, in the case where a motor-driven slide door is adopted, it is difficult to secure a space for disposing a drive unit etc.

Figure 14:
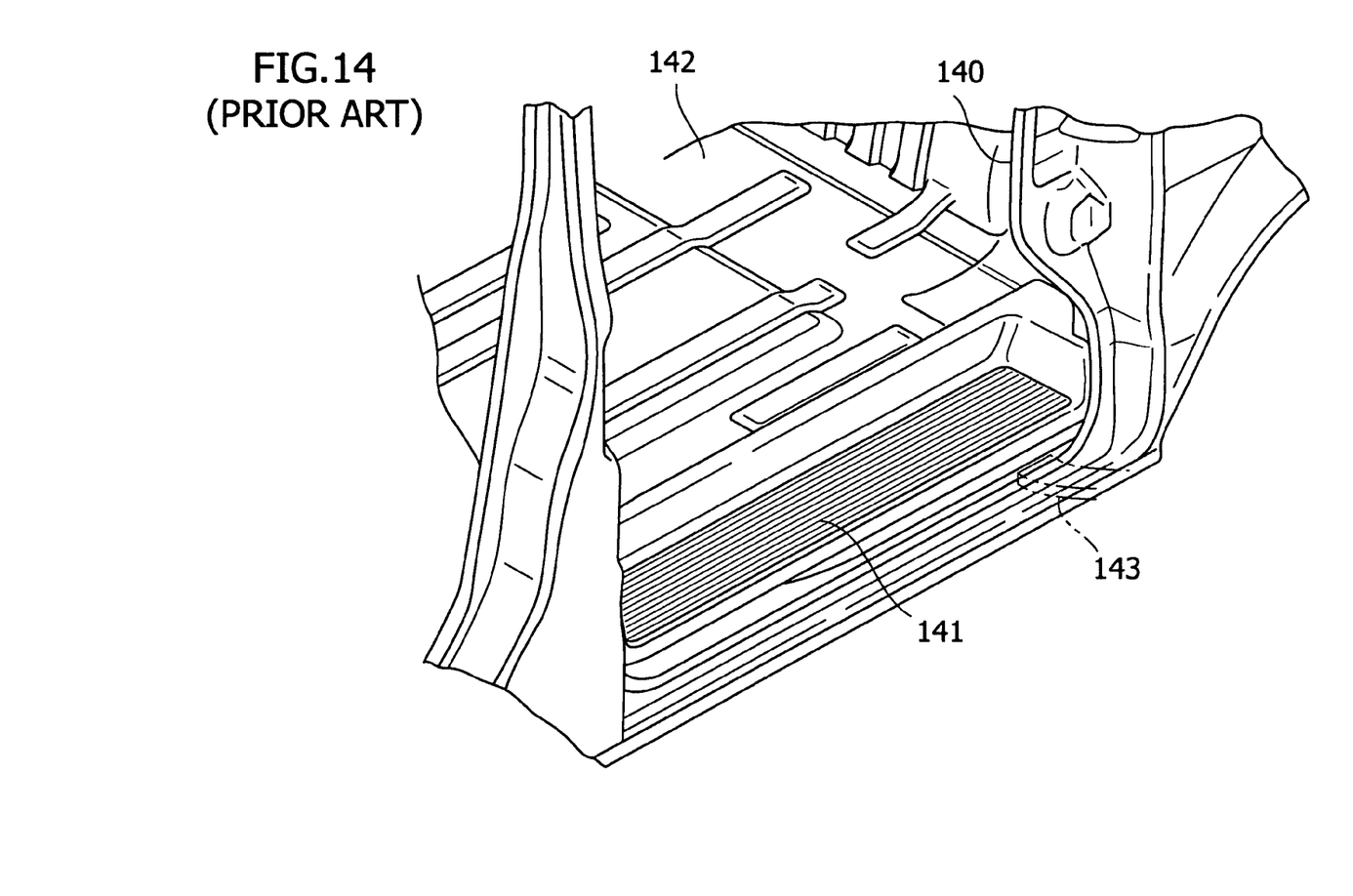
FIG. 14 is a perspective view showing a portion near a step of a conventional vehicle.

On the other hand, as shown in FIG. 14, since a step 141 is provided so as to extend to the rear end of a door opening 140, when the passenger gets on and off the seat arranged at the rear of the door opening 140 (the third row seat in a three-row seating arrangement), the passenger must go up to a floor 142 by treading on the step 141 at a location that is the narrowest and has difficulty in getting in. Moreover, since a rear portion of the step 141 is hidden by the rear edge portion of the door opening 140 and is difficult to see, the passenger may have to assume an unstable posture at the time of ingress. Further, in the lowest portion of the door opening 140, a rail for a door hinge 143 (lower arm) for supporting the slide door is provided, and the door hinge 143 is provided so as to project to the front side of the slide door, which presents a problem in that the door hinge 143 is liable to be trodden on at the time of ingress and egress.

Figure 1:
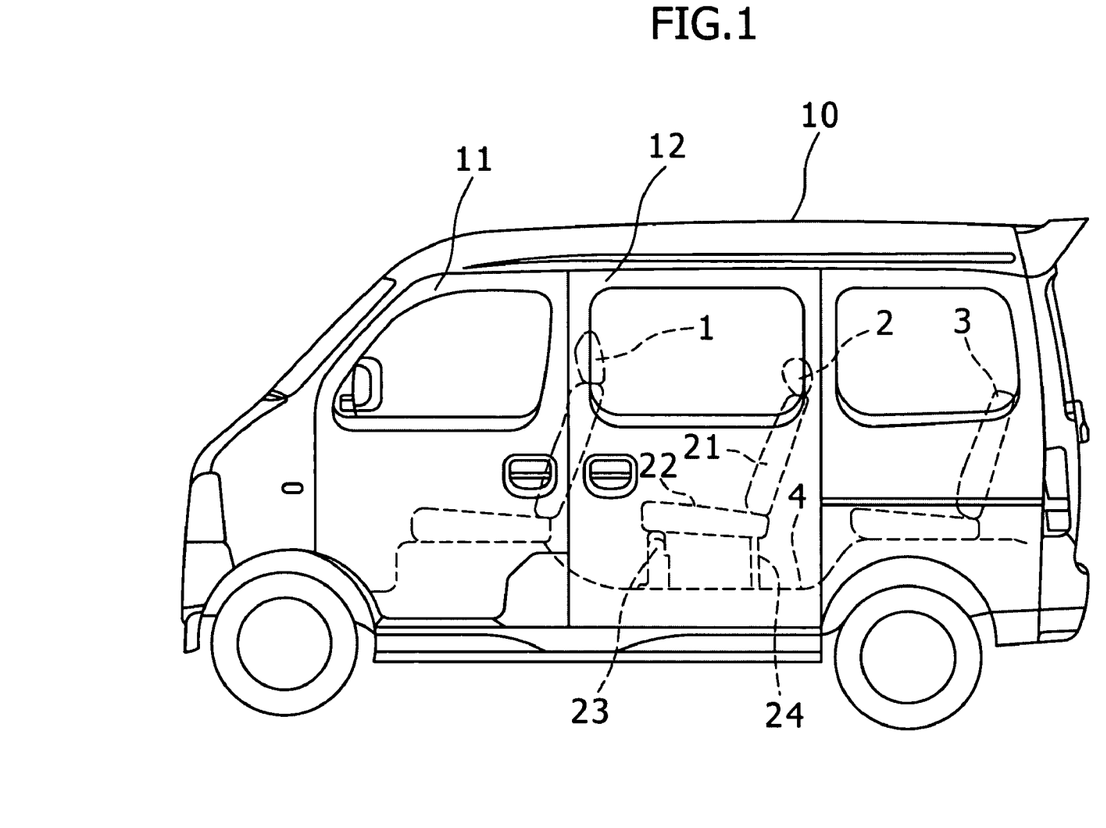
FIG. 1 is a side view of a vehicle suitable for providing an indoor structure in accordance with the present invention.

Also, since the length of vehicles is standardized, in a small-size vehicle, it is difficult to sufficiently secure a longitudinal distance for a plurality of rows of seats when indoor longitudinal length is limited. In particular, in a wagon-type vehicle in which three rows of seats 1, 2 and 3 are arranged in the vehicle longitudinal direction as shown in FIG. 1, since the engine is arranged under the floor under the first row seat 1, the passenger seated on the second row seat 2 cannot put his/her foot under the first row seat 1. Therefore, some degree of distance must be provided between the first row seat 1 and the second row seat 2 to secure a place for the passenger on the second row seat 2 to put his/her foot on the floor surface. Accordingly, the distance between the second row seat 2 and the third row seat 3 becomes narrow, so that a layout is essential in which the passenger seated on the third row seat 3 puts his/her foot under the second row seat 2.

However, on the lower rear side of the conventional second row seat 2, a rear leg 24, a lock mechanism (not shown) engaging with a striker provided on a floor 4, and the like are arranged, so that it is difficult to sufficiently secure a space for the passenger on the third row seat 3 to put his/her foot. Further, in the case where the third row seat 3 is a seat for three persons, the feet of three persons are put under the second row seat 2, so that it is further difficult to secure space.

BRIEF SUMMARY OF THE INVENTION

The present invention has been made in view of the above-described actual situation, and accordingly an object thereof is to provide an indoor structure of a vehicle, in which in an indoor structure of a vehicle provided with a step for ingress and egress on the indoor side of a door opening, and also provided with a seat located in the range of the door opening and a seat located at the rear of the above-described seat, ease of ingress to and egress from the seat at the rear of the door opening and comfort in a vehicle compartment of the passenger seated on the rear seat are improved, and a space for installing a mechanism regarding the automation of door opening/closing operation can be secured.

To achieve the above object, in an indoor structure of a vehicle including a door provided in a door opening at the side of the vehicle, and a step for passenger ingress and egress provided on the indoor side of the door opening and being located at a lower position than a floor of the vehicle compartment, an expanded floor portion substantially level with the floor is provided on the vehicle rear side of the step.

By the above-described configuration, when the passenger gets on and off the rear seat through the door opening, he/she can easily go up from the step surface to the expanded floor portion in the range of the door opening, and also when the passenger passes through a narrow location of the door opening rear end edge, he/she can easily move from the expanded floor portion to the floor having almost the same height, so that the passenger can maintain a stable posture at the time of ingress and egress. Also, the expanded floor portion is arranged adjacent to a door hinge located at the lower rear end of door opening, so that the passenger's foot is induced onto the expanded floor portion. Therefore, the door hinge can be prevented from being trodden on at the time of ingress and egress.

In a mode in which the expanded floor portion is provided partially on the floor side with respect to the vehicle width direction, and a space is formed in the door side of the expanded floor portion, a mechanism part can be housed by utilizing this space at the time when the slide door is closed. Also, in a mode in which the expanded floor portion and the step have identical or similar anti-slip uneven pattern on the top surface thereof, a foot put on the expanded floor portion can be prevented from slipping, and also the fact that the expanded floor portion is a tread surface can be recognized visually, so that the movement of the passenger can be induced smoothly.

Since the expanded floor portion comprises a floor expanding structural member separate from a vehicle body and a surface member covering the outer surface of the floor expanding structural member, the rigidity that supports a load from the upper surface of the expanded floor portion can be secured by the floor expanding structural member, and on the surface member, an anti-slip uneven pattern can be formed easily by using an easy-to-fabricate resin material. Also, sealer can be applied to appropriate locations before the floor expanding structural member is fixed, so that the work for applying sealer can be performed easily and surely.

Since the floor expanding structural member is fixed so as to connect a step panel arranged in the upper part of a side sill to a floor panel arranged in the upper part of a frame forming the vehicle body, and a space is formed therein, the load applied from the upper surface of the expanded floor portion is distributed to vehicle body forming members each having high rigidity, so that a strong expanded floor portion can be formed. Also, a drive unit etc. for the motor-driven slide door can be housed in the internal space of the floor expanding structural member. The housing position is close to the door hinge, which is favorable.

In a mode in which the surface member of the expanded floor portion covers the surface of the step panel, the surface ranging from the step to the expanded floor portion is covered by the common member, so that the appearance is good, and the sealability against dust and rain water is high.

In a mode in which in the vehicle compartment, a plurality of seats are provided in the vehicle front and rear direction in the vehicle compartment, and, of these seats, a seat arranged adjacent to the door opening is provided with front legs and rear legs; the seat can be folded in an erected state by being turned forward upon an axis of the front legs; and at least one rear leg is extended outward in the vehicle width direction in the vehicle compartment, and is placed on the expanded floor portion in a state of being capable of seating, a space under the seat is expanded in the vehicle width direction, and thus a wide space for the passenger seated on a seat at the rear of the above-described seat to put his/her foot can be secured.

Also, in a mode in which a through hole is provided in the surface member at a location of the expanded floor portion on which the rear leg should be placed, and the rear leg is placed on the floor expanding structural member within the through hole, even if the surface member of the expanded floor portion is formed by a molded product of a resin etc., a crack or damage occurring in the case where the seat leg is directly placed on the surface member can be avoided. Therefore, an expanded floor portion that is satisfactory in terms of strength and manufacturing cost can be formed without an increase in cost caused by the reinforcement of surface member or the like.

Further, in a mode in which a carpet laid on the floor is expanded to the range of the expanded floor portion, and laid between the surface member and the floor expanding structural member; and the top surface of the floor expanding structural member is covered with the carpet in the through hole portion so that the rear leg is placed on the carpet, the floor expanding structural member can be protected by utilizing the existing part, and the peeling of paint of the floor expanding structural member can be prevented without affixing a damage preventive material etc. separately. Also, since the area for pressing the end portion of carpet can be increased, the carpet can be prevented from "floating" and turning up.

DETAILED DESCRIPTION OF THE INVENTION

An embodiment of the present invention will now be described with reference to the accompanying drawings by taking a wagon-type vehicle 10 suitable for carrying out the present invention as an example. In FIG. 1, in a vehicle compartment, there are provided a first row seat 1 including a driver's seat in a vehicle front portion, a second row seat 2 arranged at the rear of the first row seat 1, and a third row seat 3 arranged further at the rear of the second row seat 2. Also, in the side portion of vehicle, there are arranged a front door 11 for opening and closing an entrance (an opening) for the first row seat 1 and a rear door 12 for opening and closing an entrance (an opening 20) for the second row seat 2 and the third row seat 3 in the named order from the vehicle front side.

Figure 2:
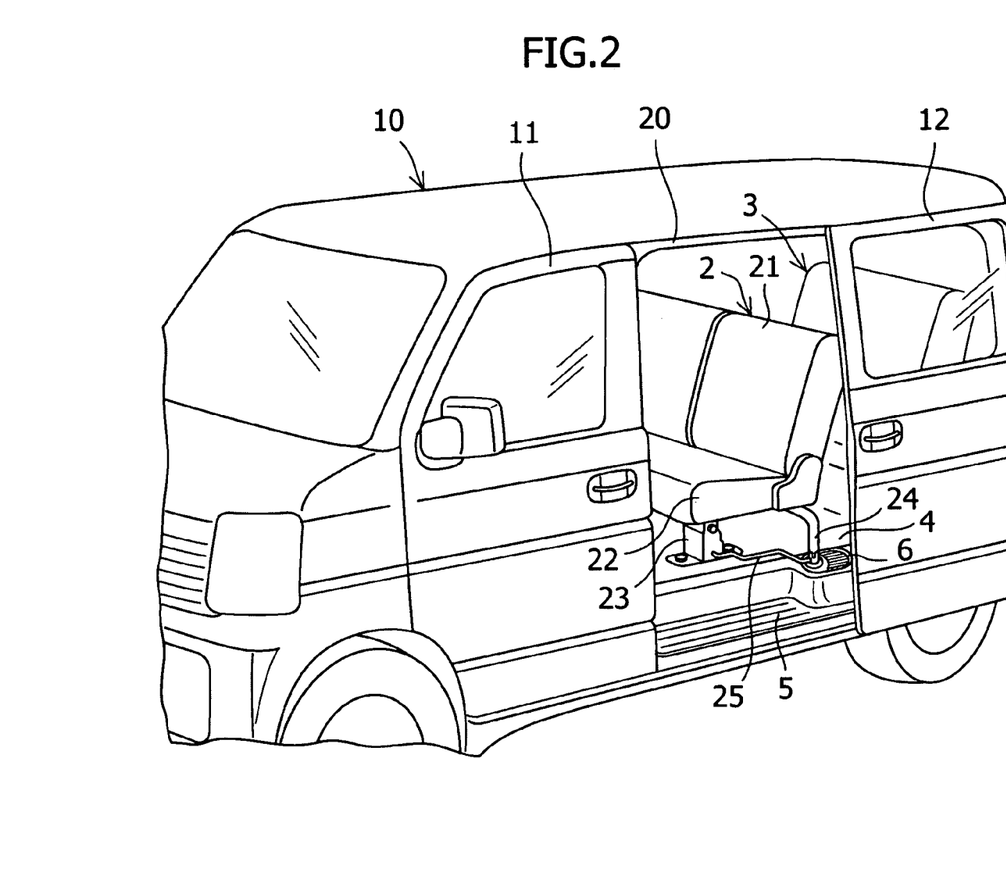
FIG. 2 is a perspective view of a vehicle provided with an indoor structure in accordance with the present invention, showing a state in which a door is open.

As shown in FIG. 2, the rear door 12 is a slide door that opens to the rear along the vehicle side surface. By sliding the rear door 12 to the rear, the opening 20 can be allowed to appear in the vehicle side portion. Since the second row seat 2 is arranged in the range of the opening 20 of the rear door 12, in the case where the passenger gets on the third row seat 3 through the opening 20 or in the case where the passenger gets off the third row seat 3 through the opening 20, the second row seat 2 must be folded.

Figure 3A:
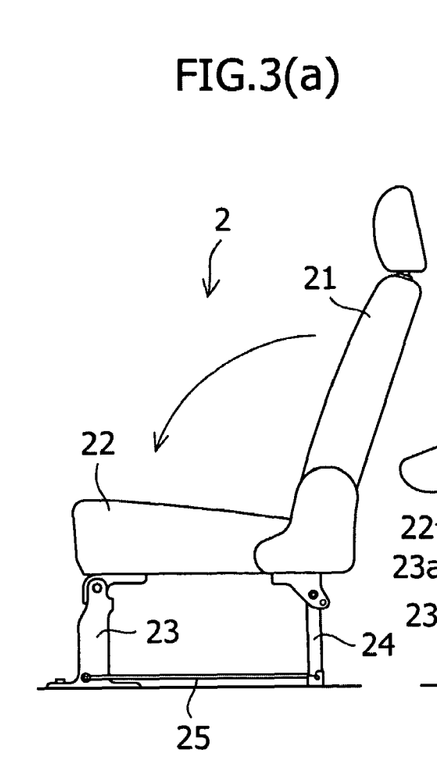
FIGS. 3A to 3C are side views showing a procedure for folding a second row seat 2.
Figures 3B, 3C:
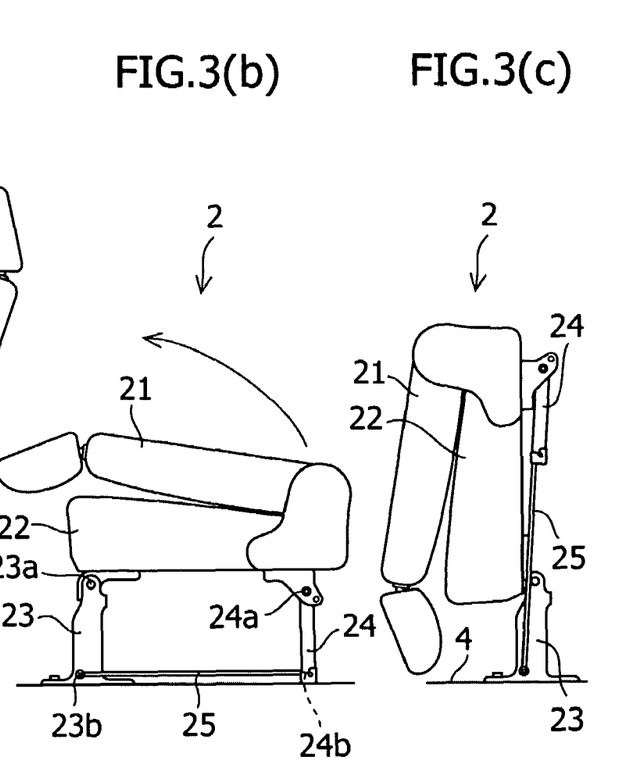

FIGS. 3A to 3C show a procedure for folding the second row seat 2. First, a seat back 21 of the second row seat 2 is brought down to the front and lapped on a seat cushion 22, and then the rear of the seat cushion 22 is pulled up with a hinge mechanism 23a of a front leg 23 being the center and is erected. Thereby, a rear leg 24 connected to the leg 23 by a rod 25 is folded along the back surface of the seat cushion 22, so that a space for the passenger to get in and out is secured.

Figure 4:
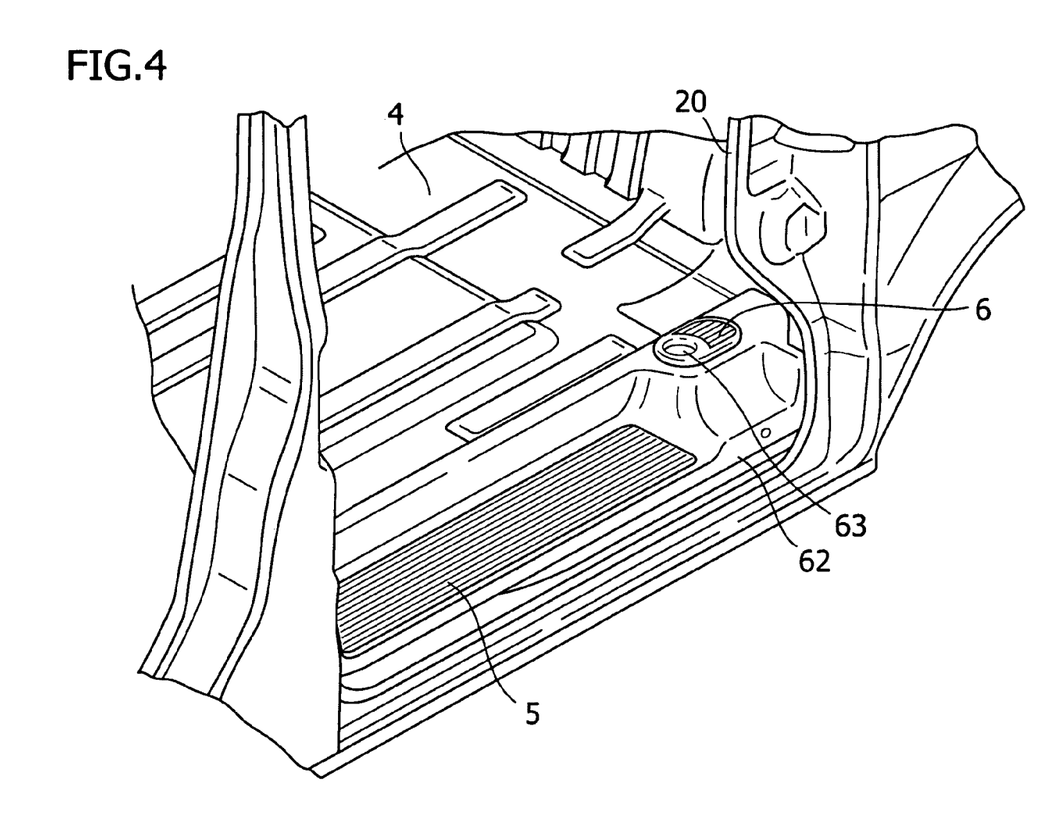
FIG. 4 is a perspective view showing a portion near a step 5 of a vehicle provided with an indoor structure in accordance with the present invention.

In the lower part of the opening 20, a step 5 that is one step lower than a floor 4 in a vehicle compartment is provided. The step 5 is what is called an incorporated step that is arranged on the indoor side of the rear door 12 when the rear door 12 is closed. As shown in FIG. 2 and FIG. 4, which is an enlarged view, a step surface of the step 5 does not extend to the whole width of door opening, and an expanded floor portion 6 having a height approximately equal to the height of the floor 4 is provided on the vehicle rear side of the step 5.

Figure 5:
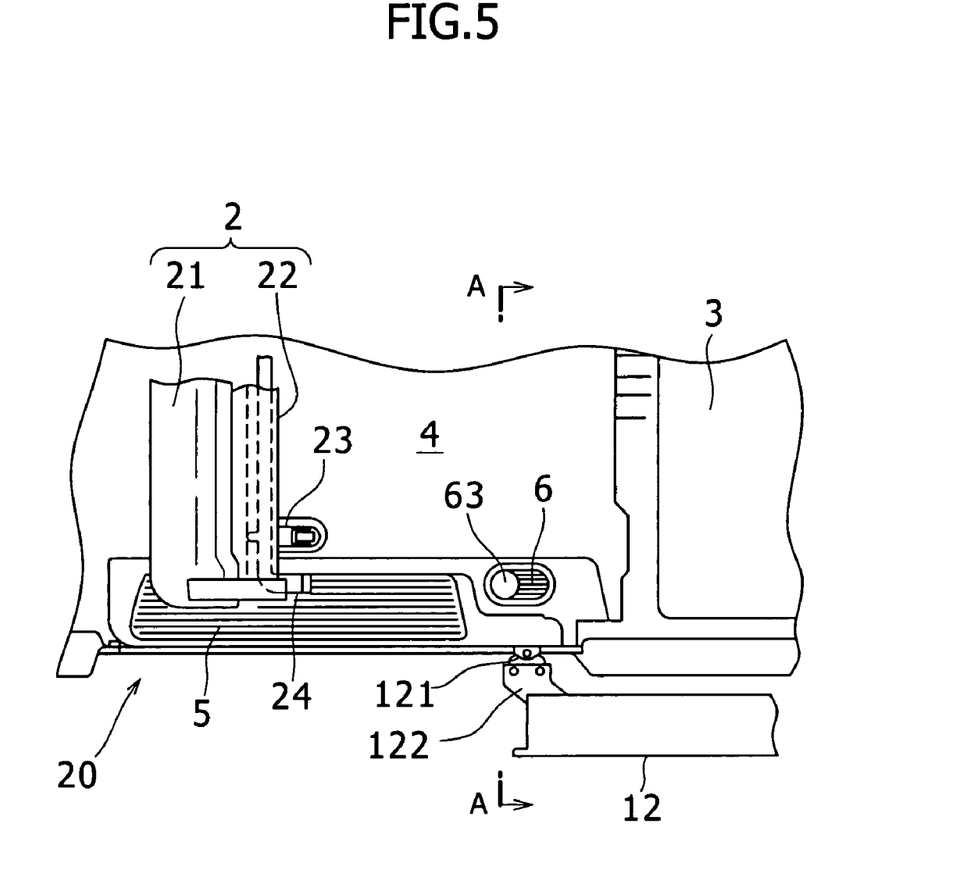
FIG. 5 is a plan view showing a portion near a door opening 20 of a vehicle provided with an indoor structure in accordance with the present invention.
Figure 6:
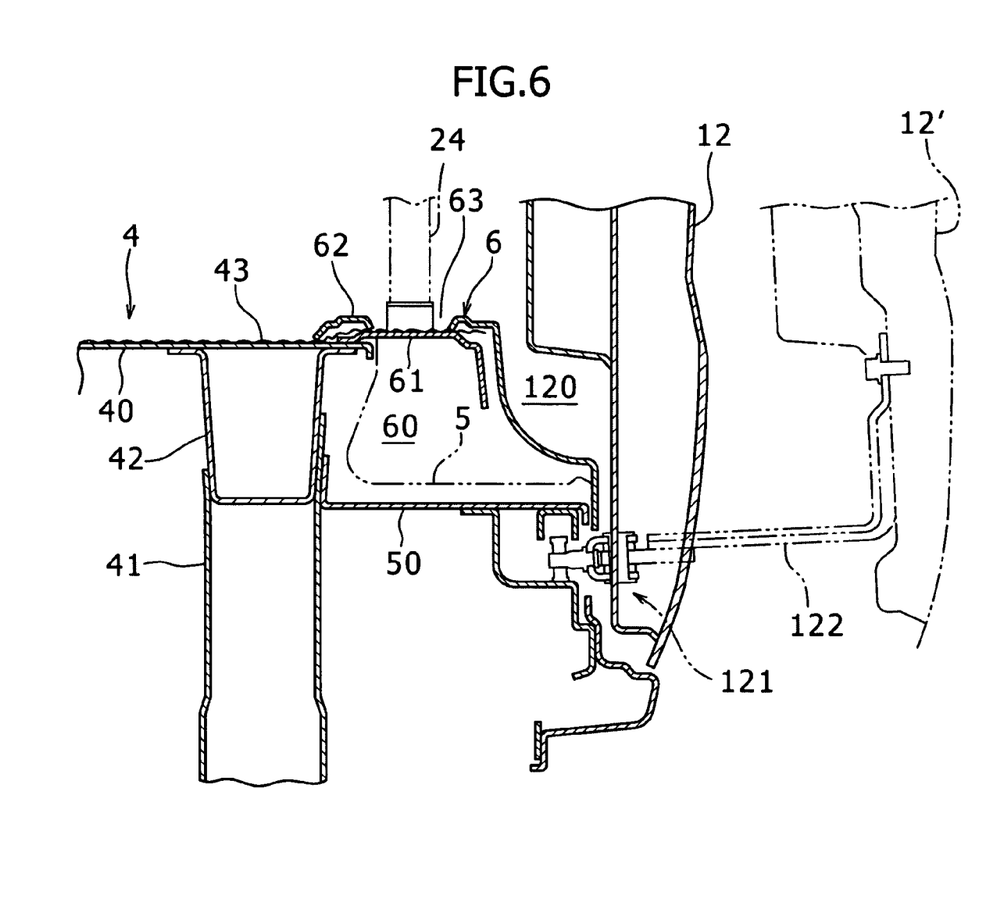
FIG. 6 is a sectional view taken along the line A-A of FIG. 5.
Figure 7:
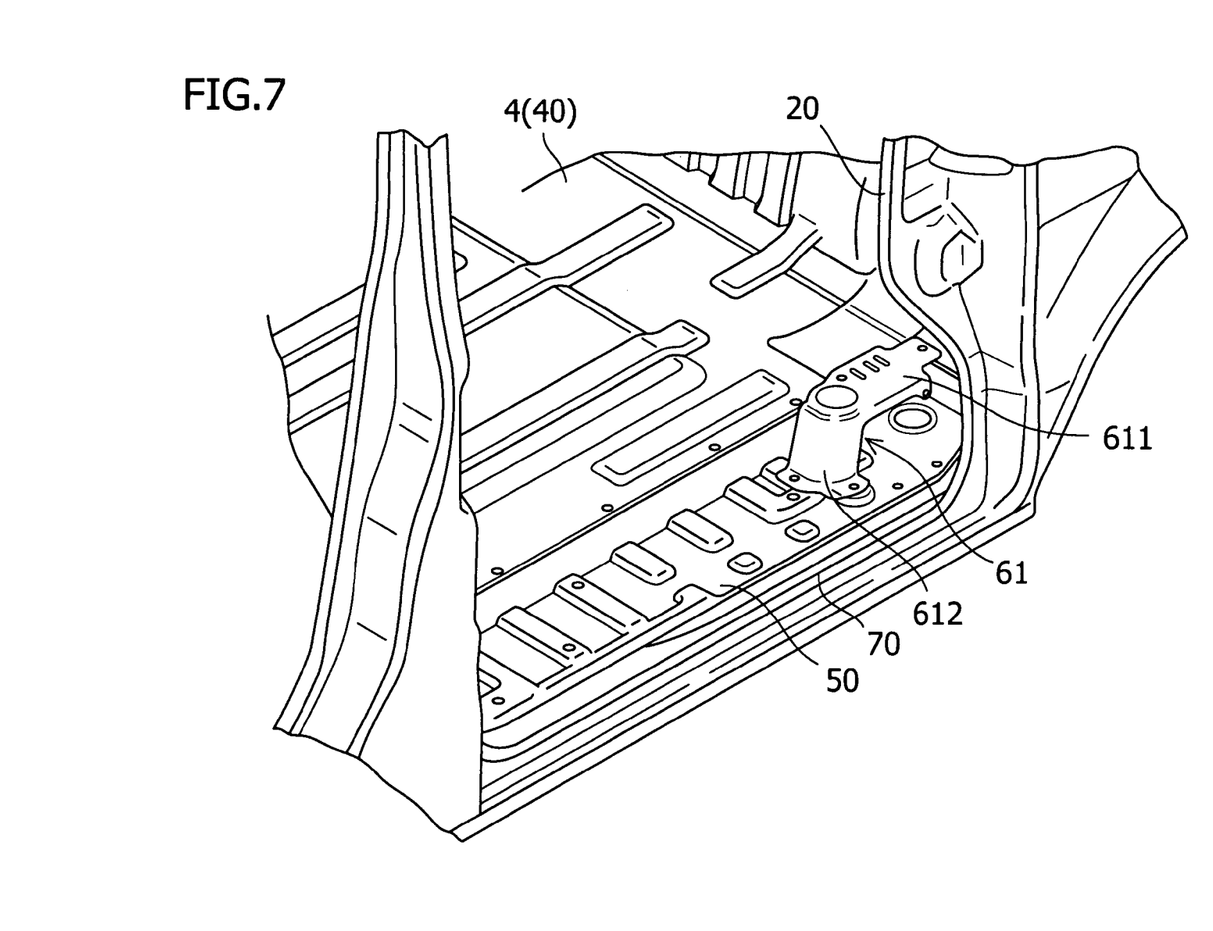
FIG. 7 is a perspective view showing a portion near a step 5 of a vehicle provided with an indoor structure in accordance with the present invention, showing a state in which a surface member 62 is removed.
Figure 8:
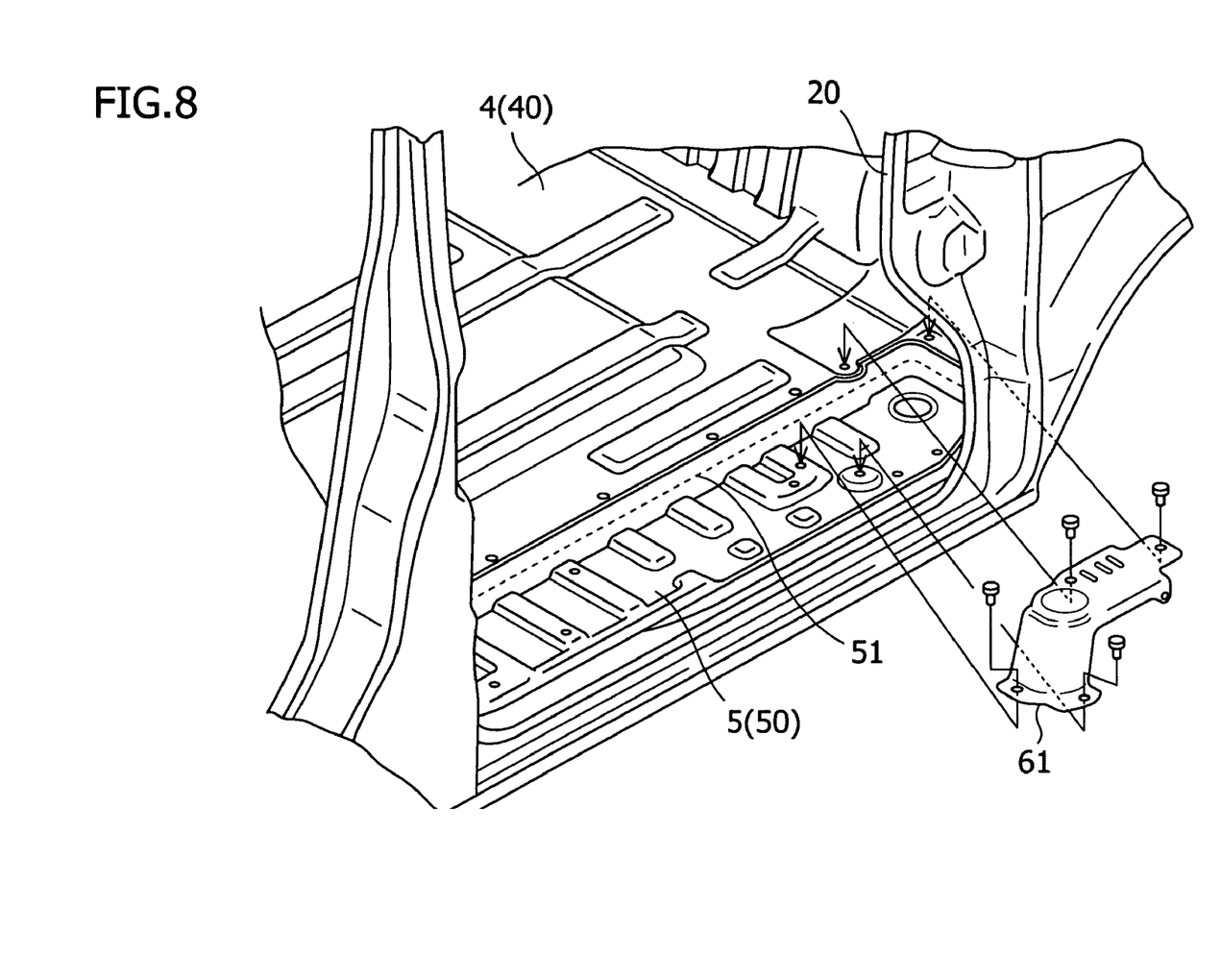
FIG. 8 is an enlarged perspective view showing a procedure for attaching a floor expanding structural member 61 to a portion near a step 5 of a vehicle provided with an indoor structure in accordance with the present invention.
Figure 9:
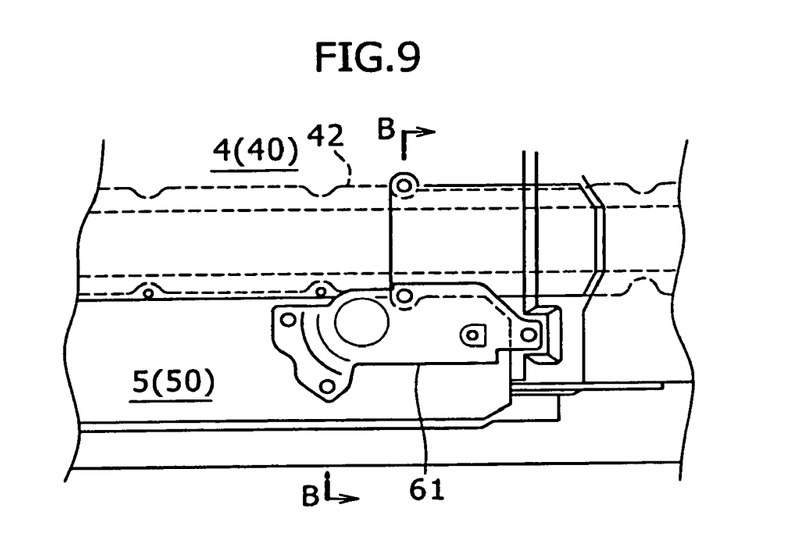
FIG. 9 is a plan view showing a portion near a step 5 of a vehicle provided with an indoor structure in accordance with the present invention, showing a state in which a surface member 62 is removed.
Figure 10:
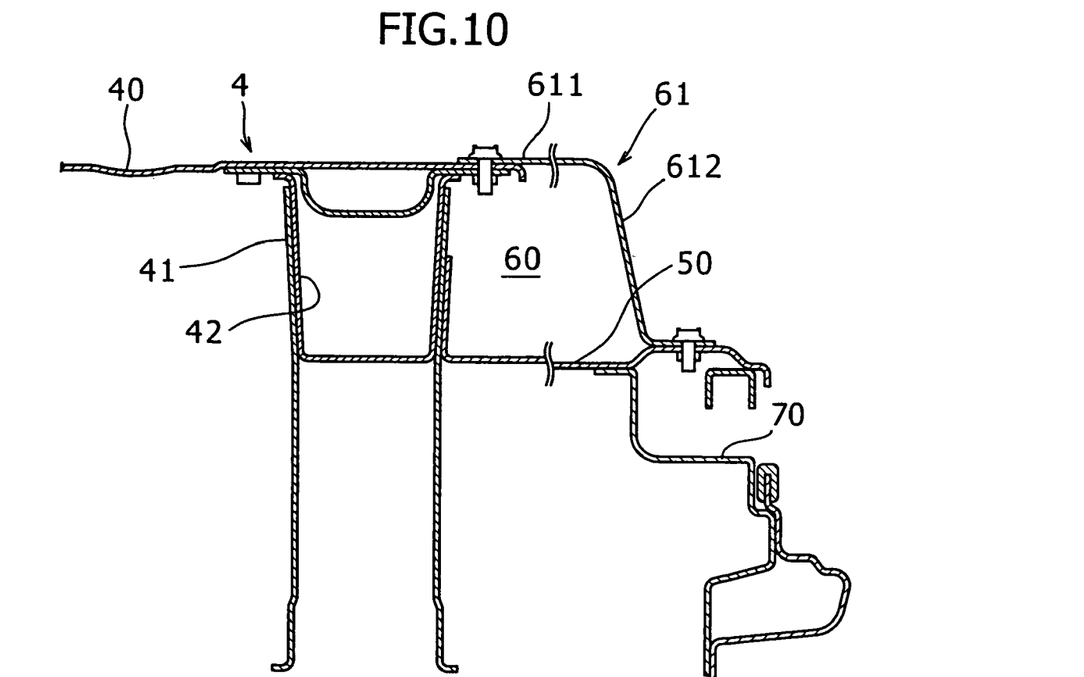
FIG. 10 is a sectional view taken along the line B-B of FIG. 9.

As shown in FIGS. 4 to 6, the expanded floor portion 6 is provided partially in a portion close to the floor 4 with respect to the depth of the step 5, and a space 120 is provided on the outside in the vehicle compartment of the expanded floor portion 6. Thereby, a slide door mechanism (a harness for power supplying to the powered slide door, or the like) in the state in which the rear door 12 is closed can be laid out. However, if the space 120 is too large, the expanded floor portion 6 does not function as a step, so that the expanded floor portion 6 is made a half or more of the depth (run) of the step 5. On the other hand, the bottom portion of the space 120 is not made a plain surface level with the step 5, but is made a curved surface or a slant surface that is continuous with the side surface. Thereby, the passenger is prevented from putting his/her foot on the bottom portion of the space 120 at the time of ingress and egress. Also, the fact that the expanded floor portion 6 is an ingress-egress surface level with the floor 4 is recognized easily, by which the passenger can be induced to put his/her foot on the expanded floor portion 6.

Figure 11:
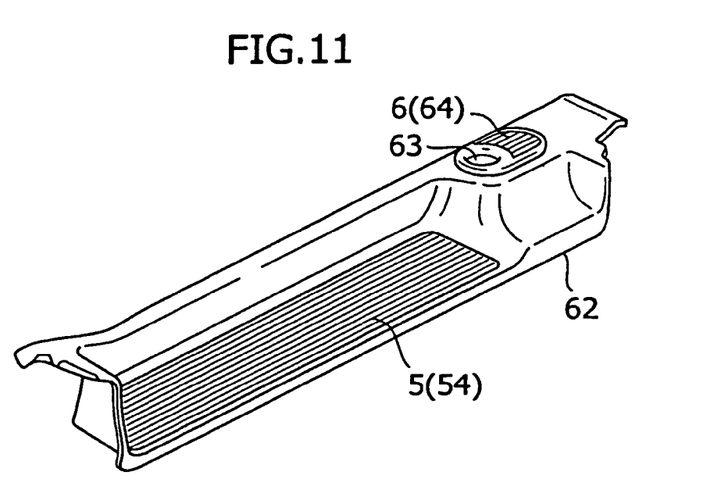
FIG. 11 is a perspective view of a surface member 62 for a step 5 and an expanded floor portion 6.

Also, as shown in FIGS. 4 and 11, an anti-slip pattern 64 is added to the surface of the expanded floor portion 6 to prevent a slip occurring when the passenger puts his/her foot on the expanded floor portion 6. Also, the anti-slip pattern 64 expresses the fact that the expanded floor portion 6 is an ingress-egress surface, by which the ingress-egress operation can be induced visually. Further, the anti-slip pattern 64 is made an uneven pattern identical or similar to an anti-slip pattern 54 of the step 5, by which the fact that the step 5 and the expanded floor portion 6 are continuous ingress-egress surfaces can be expressed more clearly, which is favorable.

A broader tread surface is secured by the expanded floor portion 6 constructed as described above, and moreover, the expanded floor portion 6 is visible from the outside of the opening 20 and easily becomes the target at the time of ingress and egress. Therefore, when the passenger gets on the third row seat, he/she can move easily from the front of vehicle side to the rear of vehicle center in the order of the side step 5, the expanded floor portion 6, and the floor 4. Therefore, before the passenger passes through a narrowest opening rear edge portion (at the time of ingress) or after he/she has passed through the rear edge portion (at the time of egress), the ascent and descent operation to and from the step 5 can be performed, so that ingress and egress can be accomplished in a stable posture.

As shown in FIG. 5, the rear end of the step 5 is located near the front end of the rear door 12 in an open state, and covers the range of the second row seat 2. Therefore, the step surface that is necessary for the ingress to and egress from the second row seat 2 is not impaired, and even when the passenger gets on and off the third row seat 3, the foot can be put on two stages of the step 5 and the expanded floor portion 6.

Further, the expanded floor portion 6 is provided near the location at which a door hinge 121 in the vehicle front and rear direction and a lower arm 122 connecting with the door hinge 121 are positioned in the state in which the rear door 12 is open, (referenced by 12' in FIG. 6), and the range of the space 120 is made a curved surface or a slant surface so that the foot is difficult to put thereon. Thereby, the passenger is induced to put his/her foot on the expanded floor portion 6 located at a position higher than the door hinge 121, and thus the possibility that the foot touches the door hinge 121 and the lower arm 122, which are movable parts, can be reduced.

Next, the internal constructions of the step 5 and the expanded floor portion 6 are explained. The step 5 is formed by covering the surfaces of a member formed of a steel material forming the structural member of vehicle body and a panel formed by a steel plate with a surface member formed of a resin etc. Since the expanded floor portion 6, too, must have rigidity capable of supporting the body weight of passenger, a floor expanding structural member 61 is provided in the expanded floor portion 6, and on the other hand, the surface thereof is covered with a surface member 62 integral with the surface member of the step 5.

As shown in FIGS. 7 to 10, the floor expanding structural member 61 basically has a trapezoidal shape having an upper surface portion 611 joined to a floor panel 40 and a partially cylindrical side surface portion 612 rising from a step panel 50 to support the front edge portion in the vehicle front and rear direction of the upper surface portion 611, and the other side surface thereof is open. In the floor expanding structural member 61, an internal space 60 connected to the outside by the opening is formed. The floor expanding structural member 61 is fixed to the floor panel 40 in the edge portion of the upper surface portion 611 and to the step panel 50 at the lower end of the side surface portion 612 by screwing members such as bolts at two places each. In the vicinity of the fixing position of the floor panel 40, frames 41 and 42 each having high rigidity are arranged, and also the step panel 50 is arranged in the upper part of a side sill 70 having high rigidity. Therefore, the floor expanding structural member 61 can obtain a high supporting force by distributing the load applied at the time of ingress and egress to the structural members.

Also, the floor expanding structural member 61 is formed separately from the step panel 50, the floor panel 40, and the like, and has a construction capable of being fixed to the vehicle body by fastening members such as bolts. Therefore, the floor expanding structural member 61 is removed when sealer is applied, and thus sealer can be applied easily to a panel joint portion 51 indicated by the broken line in FIG. 8. Further, the internal space 60 formed under the floor expanding structural member 61 allows work to be performed from the outside, so that a door mechanism part such as a unit of powered slide door can be disposed in the space 60.

The expanded floor portion 6 constructed as described above is suitable as the tread surface at the time of ingress and egress, and also is suitable as a space for mounting and supporting the rear leg 24 of the second row seat 2 spread out in a state of being capable of seating.

That is to say, as shown in FIGS. 2 and 6, the construction is such that the rear leg 24 of the second row seat 2 projects to the outside in the vehicle compartment by the expansion of the expanded floor portion 6, and the leg 24 is placed on the expanded floor portion 6 when the second row seat 2 is used. Thereby, a foot space for the passenger seated on the third row seat 3 can be secured in a narrow floor space under the second row seat 2.

Figure 12:
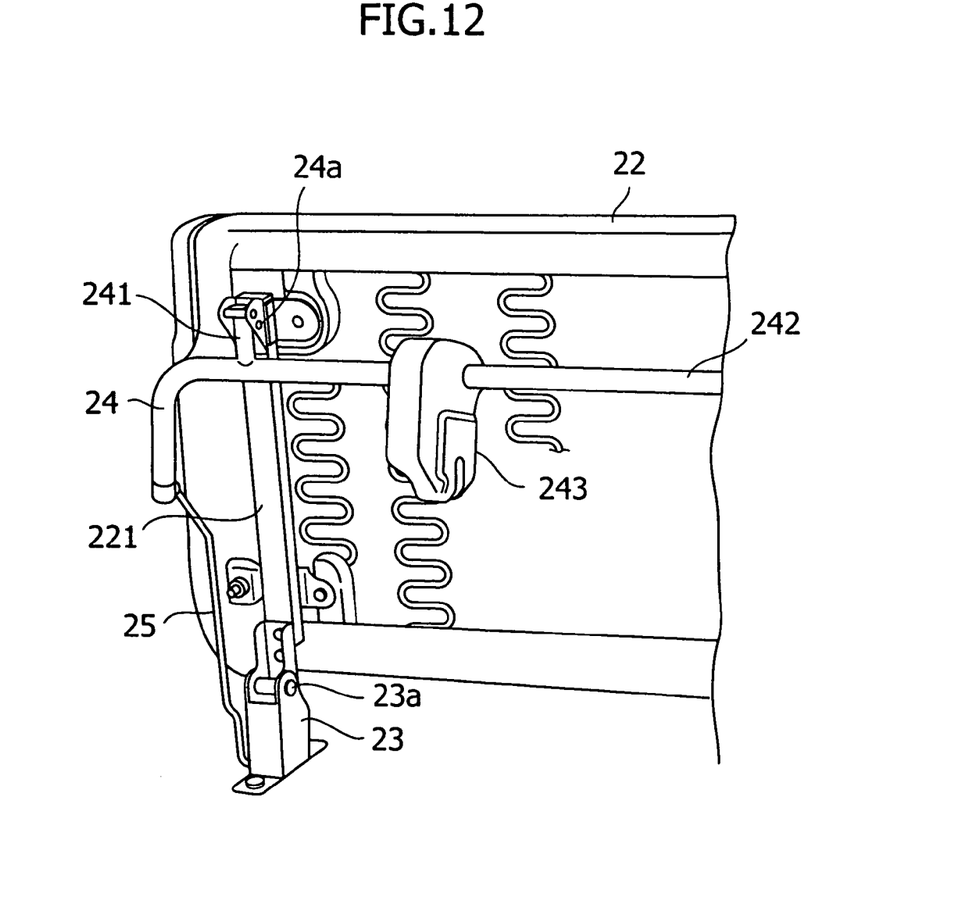
FIG. 12 is a perspective view showing a state in which a second row seat 2 is folded to the front, viewed from the rear side of vehicle.

FIG. 12 is a perspective view showing a state in which the second row seat 2 is folded forward, viewed from the vehicle rear side. In FIG. 12, the leg 24 is mainly formed by a short pipe material 241 connected to a hinge mechanism 24*a* and a long pipe material 242 that is fixed to the tip end of the short pipe material 241 and extends in the width direction of the back surface of the seat cushion 22. By bending the end portion on the outside in the vehicle compartment of the long pipe material 242, the leg 24 projecting to the outside in the vehicle compartment is formed. By forming the leg 24 by the pipe materials, the fabrication is easy, and the occupied space can be decreased. The tip end 24*b* (shown in FIG. 3(*b*)) of the leg 24 is covered with a cover member and is further fitted with a cushion rubber etc. so as to be capable of absorbing a shock caused when the vehicle body touches the ground, and also is connected to the tip end 23*b* (shown in FIG. 3(*b*)) of the front leg 23 via the rod 25. The front leg 23 is turnably attached to a frame 221 of the seat cushion 22 via a hinge mechanism 23*a*.

Conventionally, the leg has been arranged so as to extend just below from the attachment portion (the hinge mechanism 24*a* or the short pipe material 241) of the seat cushion 22. However, in the present invention, the leg is bent at an intermediate position and is offset to the outside in the vehicle compartment as described above, by which a space for the passenger to put his/her foot under the seat cushion 22 can be secured.

Figure 13:
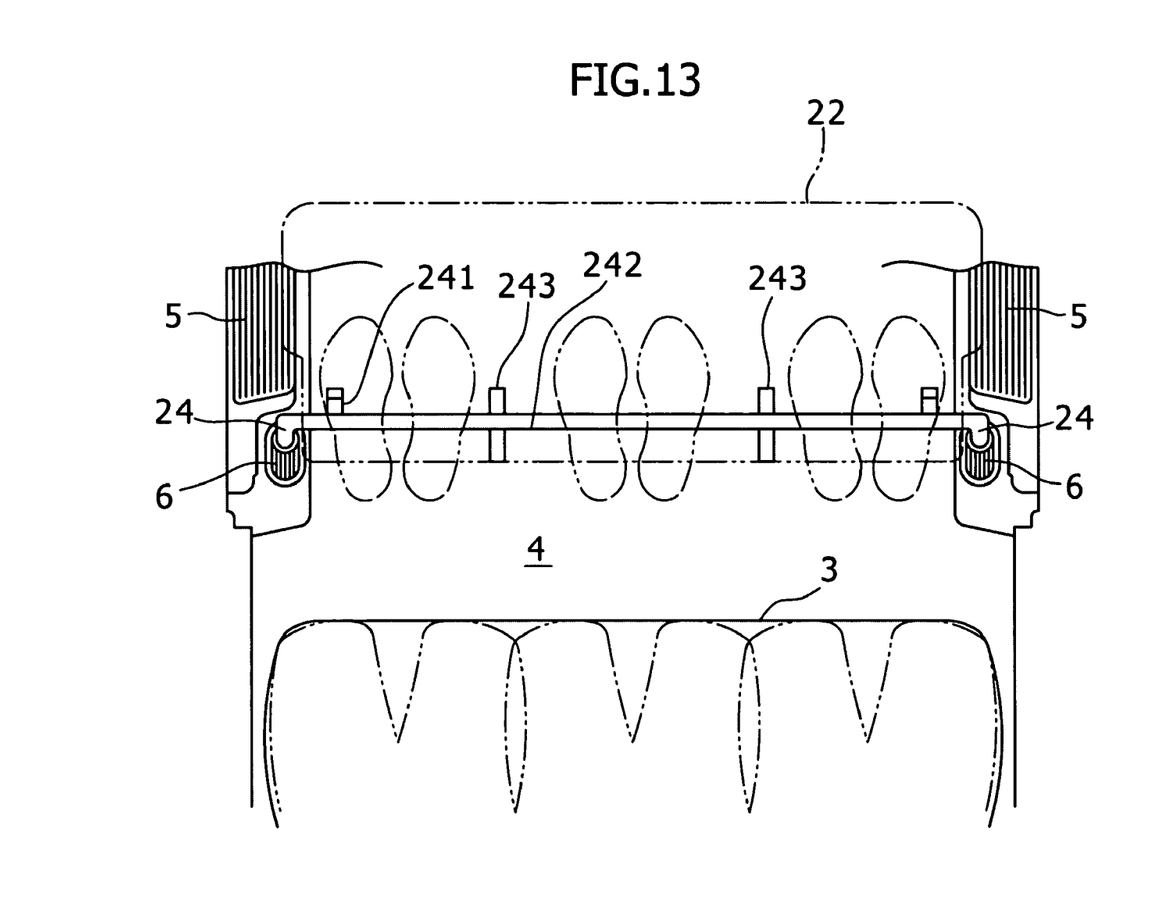
FIG. 13 is a schematic plan view showing a portion near a second row seat 2 and a third row seat 3.

Further, a lock mechanism 243 for fixing the leg 24 to the floor 4 is mounted at an intermediate position of the long pipe material 242 so as to be capable of being engaged with a striker (not shown) provided on the floor 4, by which the movable side (rear side) of the second row seat 2 in a state of being capable of seating is fixed to the vehicle body. Since the cam-type lock mechanism generally has a plate shape parallel with a striker bar engaging in the thickness direction, as shown in FIG. 12, the lock mechanism 243 is fixed perpendicularly to the lengthwise direction of the long pipe material 242 so that the lock mechanism 243 is arranged along the vehicle front and rear direction. Thereby, a space which the lock mechanism 243 occupies in the vehicle width direction can be reduced, and accordingly the space for the passenger to put his/her foot can be secured. By the above-described configuration of the leg 24, as shown in FIG. 13, the space for three passengers seated on the third row seat 3 to put their feet can be secured under the seat cushion of the second row seat 2.

On the other hand, as shown in FIGS. 4 and 6, in the expanded floor portion 6, a through hole 63 is provided at a location of the surface member 62 (interior material made of a resin), at which the tip end of the leg 24 comes into contact with the expanded floor portion 6. A carpet 43 laid on the floor 4 is expanded to under the expanded floor portion 6 and is laid between the floor expanding structural member 61 and the surface member 62, so that the carpet 43 covering the floor expanding structural member 61 is exposed from the through hole 63.

Thereby, the tip end of the leg 24 can be placed in the through hole 63 covered with the carpet 43. Therefore, even in the case where the surface member 62 is formed by using a material having a relatively low rigidity, such as a resin material, a crack or flaw can be prevented. Also, since the floor expanding structural member 61 having a sufficient rigidity is located at the location of the through hole 63, the loads of the second row seat 2 and the passenger who gets in and out can be supported surely. Also, since the surface of the floor expanding structural member 61 is covered with the carpet 43, the peeling of or damage to the paint can be prevented. Further, since the carpet 43 is not affixed separately to the position of the through hole 63, and the carper laid on the floor 4 is utilized, not only the number of parts and the assembling manpower can be reduced but also the float of the periphery of the carpet 43 can be prevented without adding a special fixing part because the range in which the carpet 43 is held by the surface member 62 spreads. Also, the peeling etc. of carpet, which occurs in the case where a carpet is affixed separately to the position of the through hole 63, can be prevented.

The above is a description of one embodiment of the present invention. The present invention is not limited to the above-described embodiment, and various modifications and changes can be made based on the technical concept of the present invention.

What is claimed is:

1. An indoor structure of a vehicle, comprising:
   a door provided in a door opening at the side of the vehicle, and
   a step for passenger ingress and egress provided on the indoor side of the door opening and being located at a lower position than a floor of the vehicle compartment,
   wherein an expanded floor portion substantially level with the floor is provided on the vehicle rear side of the step,
   wherein the expanded floor portion comprises a floor expanding structural member separate from a vehicle body and a surface member covering the outer surface of the floor expanding structural member.

2. The indoor structure of a vehicle according to claim 1, wherein the expanded floor portion is provided partially on the floor side with respect to the distance in the vehicle width direction of the step, and a space is formed in the door side of the expanded floor portion.

3. The indoor structure of a vehicle according to claim 1, wherein the expanded floor portion and the step have identical or similar anti-slip uneven pattern on the top surface thereof.

4. The indoor structure of a vehicle according to claim 1, wherein the floor expanding structural member is fixed so as to connect a step panel arranged in the upper part of a side sill to a floor panel arranged in the upper part of a frame forming the vehicle body, and a space is formed therein.

5. The indoor structure of a vehicle according to claim 1, wherein the surface member of the expanded floor portion covers the surface of the step panel.

6. The indoor structure of a vehicle according to claim 1, wherein, a plurality of seats are provided in the vehicle front and rear direction in the vehicle compartment, and, of these seats, a seat arranged adjacent to the door opening is provided with front legs and rear legs; the seat can be folded in an erected state by being turned forward upon an axis of the front legs; and at least one rear leg is extended outward in the vehicle width direction in the vehicle compartment, and is placed on the expanded floor portion in a state of being capable of seating.

7. The indoor structure of a vehicle according to claim 6, wherein a through hole is provided in the surface member at a location of the expanded floor portion on which the rear leg should be placed, and the rear leg is placed on the floor expanding structural member within the through hole.

8. The indoor structure of a vehicle according to claim 7, wherein a carpet laid on the floor is expanded to the range of the expanded floor portion, and laid between the surface member and the floor expanding structural member; and the top surface of the floor expanding structural member is covered with the carpet in the through hole so that the rear leg is placed on the carpet.

9. An indoor structure of a vehicle, comprising:
   a door provided in a door opening at the side of the vehicle, and
   a step for passenger ingress and egress provided on the indoor side of the door opening and being located at a lower position than a floor of the vehicle compartment,
   wherein an expanded floor portion substantially level with the floor is provided on the vehicle rear side of the step,
   wherein, a plurality of seats are provided in the vehicle front and rear direction in the vehicle compartment, and, of these seats, a seat arranged adjacent to the door opening is provided with front legs and rear legs; the seat can be folded in an erected state by being turned forward upon an axis of the front legs; and at least one rear leg is extended outward in the vehicle width direction in the vehicle compartment, and is placed on the expanded floor portion in a state of being capable of seating.

10. The indoor structure of a vehicle according to claim 9, wherein a through hole is provided in the surface member at a location of the expanded floor portion on which the rear leg should be placed, and the rear leg is placed on the floor expanding structural member within the through hole.

11. The indoor structure of a vehicle according to claim 10, wherein a carpet laid on the floor is expanded to the range of the expanded floor portion, and laid between the surface member and the floor expanding structural member; and the top surface of the floor expanding structural member is covered with the carpet in the through hole so that the rear leg is placed on the carpet.

* * * * *

UNITED STATES PATENT AND TRADEMARK OFFICE
CERTIFICATE OF CORRECTION

PATENT NO.         : 7,648,194 B2
APPLICATION NO.    : 11/789838
DATED              : January 19, 2010
INVENTOR(S)        : Kiyoshi Hirasawa et al.

It is certified that error appears in the above-identified patent and that said Letters Patent is hereby corrected as shown below:

On the Title of the Patent (75) Inventors: "Iwata" should read --Iwata-Shi--.

Signed and Sealed this
First Day of March, 2011

David J. Kappos
*Director of the United States Patent and Trademark Office*